No. 884,159. PATENTED APR. 7, 1908.
E. A. JACKMAN.
DENTAL PLATE.
APPLICATION FILED AUG. 9, 1907.

Witnesses
Frank B Hoffman
C. Bradway

Inventor
Edwin A. Jackman
By Victor J. Evans
Attorney

UNITED STATES PATENT OFFICE.

EDWIN A. JACKMAN, OF HARTINGTON, NEBRASKA.

DENTAL PLATE.

No. 884,159.   Specification of Letters Patent.   Patented April 7, 1908.

Application filed August 9, 1907. Serial No. 387,914.

*To all whom it may concern:*

Be it known that I, EDWIN A. JACKMAN, a citizen of the United States, residing at Hartington, in the county of Cedar and State of Nebraska, have invented new and useful Improvements in Dental Plates, of which the following is a specification.

This invention relates to dental plates, and more particularly to means for attaching the rubber supporting the teeth to the metal plate which is preferably aluminium which readily transmits heat and cold to the sensatory nerves.

The invention has for one of its objects to improve and simplify the construction of dental plates so as to be comparatively easy and inexpensive to manufacture, of durable and substantial construction, and satisfactory in use.

A further object of the invention is the provision of a dental plate composed of aluminium that is provided with welt-like flanges cut out from the surface and burred over at the edge so as to form means for anchoring the rubber portion of a set of teeth to the metal plate without danger of dislocation of the teeth without respect to the plate.

With these objects in view and others, as will appear as the description proceeds, the invention comprises the various novel features of construction and arrangement of parts which will be more fully described hereinafter and set forth with particularity in the claims appended hereto.

Figure 1:
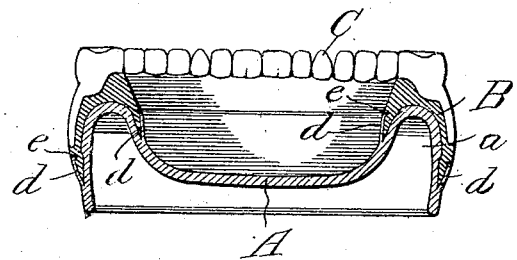
Figure 2:
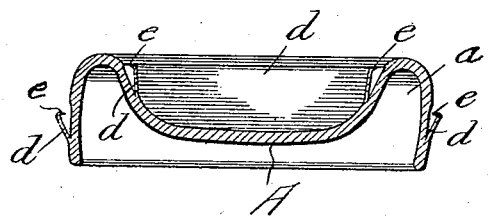

In the accompanying drawing, which illustrates one of the embodiments of the invention, Figure 1 is a transverse section of an upper set of teeth. Fig. 2 is a similar section of the plate thereof.

Similar reference characters are employed to designate corresponding parts throughout the several views.

In the present instance, I have elected to illustrate my invention as embodied in a set of upper teeth, but it is to be understood that the same can be carried out in practice with a lower set with equal facility.

Referring to the drawing, A designates the metal plate or body portion of the set of teeth which is of any approved form and shape to fit the mouth of the user, there being applied to the ridge $a$ the usual rubber $b$ in which the teeth $c$ are embedded in the usual manner. In accordance with the present invention, the rubber $b$ is anchored on the metal plate A by means of welt-like flanges $d$, and these flanges are preferably arranged on the ridge $a$ by skiving the metal at the outer surface and along either the outside or inside faces of the ridge. These welts or flanges may extend entirely around the ridge, as shown, or be made in sections, as preferred. The edges of the welts are bent inwardly, as at $e$, Fig. 2, so as to present a hook-like formation. The rubber B is molded and vulcanized to fit around the ridge on both sides and the edges of rubber are inserted under the welts, which latter are pressed firmly against the rubber so as to embed the sharp turned over edges $e$ into the latter. By this means, the rubber is securely held in place on the plate. The dental plates constructed in accordance with the invention are extremely simple, substantial, and the teeth are firmly anchored in place.

From the foregoing description, taken in connection with the accompanying drawing, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative and that such changes may be made when desired, as are within the scope of the claims.

Having thus described the invention, what I claim is:—

1. A set of teeth comprising a swaged plate having an integral welt extending around the plate, and a tooth-carrying rubber anchored on the plate by the welt and clamped between the plate and welt.

2. A dental plate comprising a swaged plate, one or more continuous and unbroken welts formed thereon and having the free edge or edges turned laterally to present a hook formation, and a body of suitable material anchored on the plate by the welt or welts and adapted to receive the teeth, the said material being clamped between the plate and welt or welts.

In testimony whereof, I affix my signature in presence of two witnesses.

EDWIN A. JACKMAN.

Witnesses:
R. G. MASON,
H. P. RANKIN.